US007215241B2

(12) United States Patent
Ghazarian

(10) Patent No.: US 7,215,241 B2
(45) Date of Patent: May 8, 2007

(54) TAMPER DETECTION SENSOR ANTENNA

(76) Inventor: Ohanes Ghazarian, 308 Gondola Way, Henderson, NV (US) 89074

( * ) Notice: Subject to any disclaimer, the term of this patent is extended or adjusted under 35 U.S.C. 154(b) by 407 days.

(21) Appl. No.: 10/392,662

(22) Filed: Mar. 19, 2003

(65) Prior Publication Data

US 2003/0179098 A1 Sep. 25, 2003

(51) Int. Cl.
*B60R 26/10* (2006.01)
(52) U.S. Cl. .................. 340/426.26; 340/552; 340/540
(58) Field of Classification Search ........... 340/426.26, 340/552, 573.4, 600, 635, 540
See application file for complete search history.

(56) References Cited

U.S. PATENT DOCUMENTS 5,748,084 A * 5/1998 Isikoff ...................... 340/568.1
5,754,104 A * 5/1998 Saito ........................ 340/539.1
5,793,290 A * 8/1998 Eagleson et al. ........ 340/573.4
6,111,503 A * 8/2000 Javitt et al. ................. 340/552
6,703,936 B2 * 3/2004 Hill et al. ................ 340/573.4

* cited by examiner

*Primary Examiner*—Daryl C Pope

(57) ABSTRACT

A communication interfering object presence detection sensor, for use with an antenna system, which initiates an alarm signal whenever a communication interfering object presence is detected by said antenna sensor for a predetermined time within proximity of said antenna.

The object presence detection sensor generates an optical, RF, ultrasonic or magnetic field signal(s) around an antenna towards a preset distance from the antenna, generating antenna operation protective shield signal(s) around said antenna.

Communication interfering object presence detection sensor of the present invention is responsive to the detection of object(s) presence within the pattern of said sensor-generated signals.

The object detection sensor antenna of the present invention additionally transmits said alarm signals to a monitoring station containing information to both said antenna tamper condition and to said antenna location.

And the communication interfering object detection sensor antenna of the present invention is capable of sending signal(s) to immobilize a vehicle upon detection of a communication interfering object presence within the pattern of object detection signal(s).

12 Claims, 4 Drawing Sheets

Monitoring Station
36
50
22 Mass
23 optical signal
wireless modem
34
20 Vehicle
21 ruder
Engine Immobilizer
32
GPS 30 Receiver
10 GPS sensor Antenna Top View
11
12 Sensor
23
Sensor Signal
19
GPS Antenna
11 wire Harness
13
14
15

17 protective Shield Signal
Antenna 16
12
18 RF Communication Apparatus

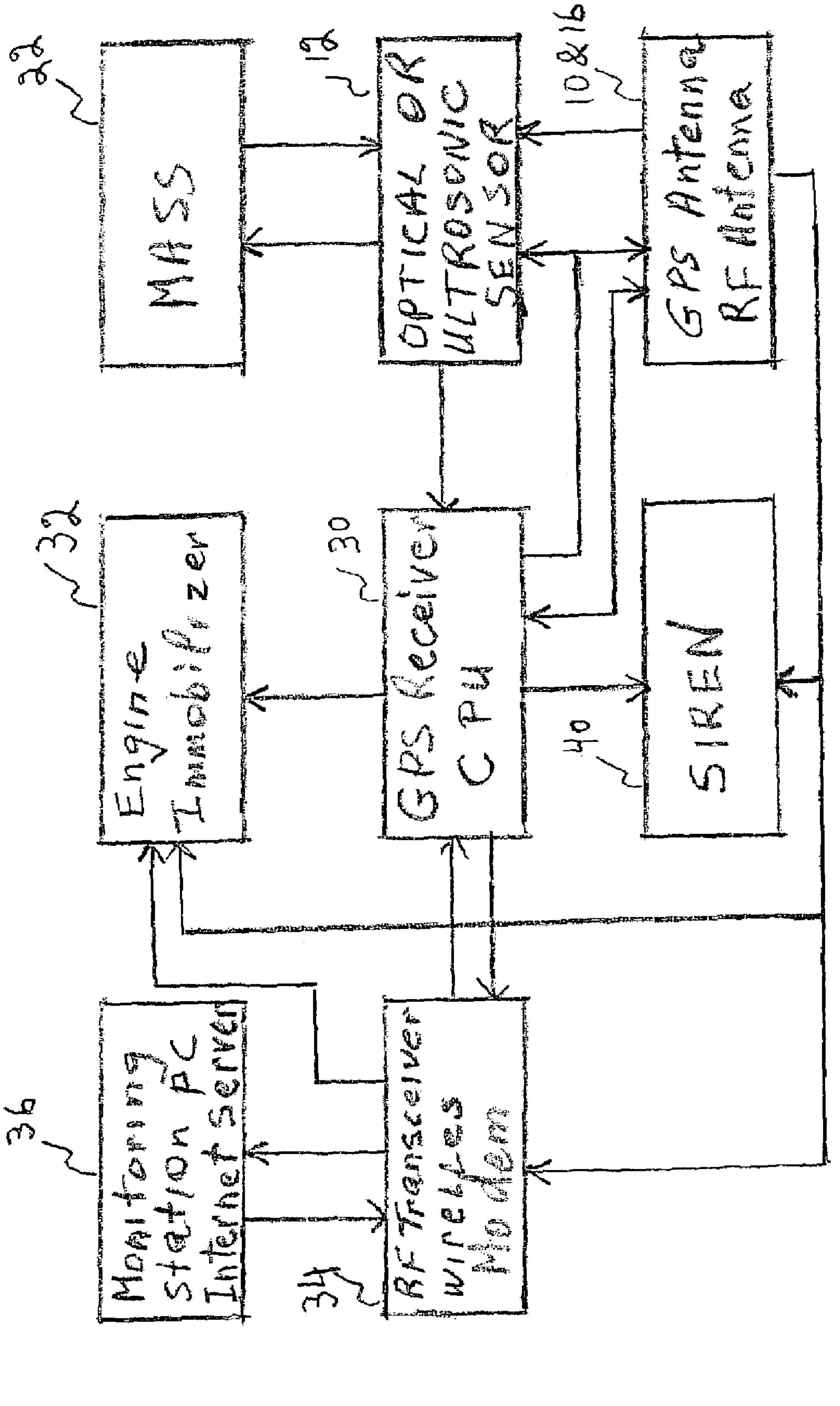
FIG. 4 Block Diagram

TAMPER DETECTION SENSOR ANTENNA

BACKGROUND OF THE INVENTION

Present invention relates generally for securing an antenna operation to be used for RF communication, and more in particularly to an improved antenna system for detecting the presence of a communication interfering object (Mass) covering or blocking an antenna at a set distance from the antenna, where as such object interferes or blocks the functional operation (transmit or receive signals) of an antenna.

Over the recent past, there have been many antenna designs available to be used with RF communication devises, such as Radios, Wireless Alarm devises, GPS units, Satellite communication systems, cellular phones, wireless video, wireless modems Etc. Virtually all of this antenna systems operation could not be secured due to tampering. One such example, if and when a person intention is to bypass the communication between a GPS based tracking system for tracking vehicles, for steeling a vehicle, or bypass a wireless Commercial or residential alarm communication with a monitoring station, for burglarizing a building without being noticed. One such technique is achieved by covering the antenna in use with a wireless security system, by the use of an aluminum foil. If a vehicle is equipped with a GPS tracking system, and it's being target for theft. The thieve covers the vehicle GPS antenna with an object (windshield shade) to blocks the vehicle GPS unit from receiving GPS satellite signals, and easily steel the vehicle, without being noticed by a monitoring station.

It is primary objective of the present invention using a tamper detection sensor antenna to secure the operation of an antenna used primarily in wireless security, wireless video monitoring, GPS tracking and other related applications, where an antenna is in use to communicate or receive signals from monitoring station or other means. The present invention antenna uses an object (mass) presence detection sensor, for the detection of the presence of communication interfering objects covering or blocking an antenna from a set distance.

It is the objective of present invention that uses an antenna with diffused reflection optical sensor to detect the presence of antenna communication interfering objects presence covering or blocking an antenna from a set distance.

It is the objective of the present invention that utilizes an ultrasonic sensor to detect a communication interfering object presence covering or blocking an antenna from a set distance, which interferes with the operation of the antenna.

It is the objective of the present invention that uses an RF or a microwave sensor, which generates signals surrounding an antenna to detect the presence of a communication interfering object covering or blocking an antenna from a set distance of an antenna. It is an objective of the present invention that utilizes a tamper detection antenna using a magnetic field sensor, to detect the presence of a communication interfering object covering or blocking an antenna located at a set distance from the antenna.

It is primary objective of the present invention that utilizes a communication interfering object presence detection sensor antenna, which will transmit an alarm signal when a communication interfering object covers or blocks an antenna at a preset distance. It is another objective of the present invention wherein communication interfering object presence detection antenna system signals a monitoring station by means of a hardwire signal or wirelessly by use of a secondary antenna to a monitoring station. It is further objective of the present invention to immobilize a vehicle upon detection to the presence of an antenna communication interference object(s) entering within proximity of a set distance from a vehicle GPS tracking antenna system.

Finally, it is further objective of the present invention, which uses a tamper detection sensor antenna is used with a communication apparatus, wherein if the sensor antenna wire is being cut, or disconnected from said apparatus, the apparatus will generate a tamper alarm signal.

The components used in the present art, utilizes parts which are commercially available, easily fund of self, it is inexpensive and easily installed.

SUMMARY OF THE INVENTION

The object of the present invention is to provide a secure reception and a transmission from an RF antenna, in particularly from an antenna used in a wireless security applications, such as a GPS antenna, for the tracking of valuable assets, by the use of tamper detection Sensor antenna for securely tracking of moving assets. The present invention tamper detection sensor antenna is designed to detected the presence of communication interfering object around or over the antenna, and for such object presence detection, it utilizes sensors such as; a diffused reflection optical sensor(s), ultrasonic sensor(s), RF microwave or magnetic field sensors, the sensors are mounted within or near by the antenna, generating object detection signals surrounding the antenna typically in a vertical direction (facing upwards). The object presence detecting defused reflection optical sensor, the magnetic field generating sensor, and RF or microwave signal generating sensor antenna, preferably is installed on a vehicle/asset or inside vehicle facing up the vehicle windshield (or on the rear view mirror) mounted on the inner side of the windshield, vehicle rear deck or rear window. Tamper detection sensor antenna utilizing Ultrasonic sensor preferably is installed on top of a vehicle, an asset, or a security alarm panel, Etc.

Tamper detection sensor antenna unit of the present invention transmits Optical diffused reflection, Ultrasonic, magnetic or RF and or microwave signals within a pre-set distance from the antenna, approximately 2 to 10 feet from the base of the antenna upwards-vertical direction. When an attempt is being made by an intruder to cover the antenna by use of an object (Mass), such as metal, aluminum foil etc. to interfere with the antenna transmission or reception signals. At a predetermined time, the antenna sensor sends an alarm signal to a communication devise. Which upon receipt of the signal will transmit a unique coded signal to a monitoring station by means of a hardwire or wirelessly through the use of a secondary antenna. In an automobile application the tamper sensor antenna system upon detecting the presence of communication interfering objects for a predetermined time around the proximity of the antenna, the sensor antenna sends a signal to immobilize the vehicle.

In preferred embodiment of the invention, tamper detection sensor antenna is connected to an RF communication devise through a hardwire connection, The first connection wire provides power to operate the antenna sensor, and used for transmitting communication signals to the RF communication devise. A second connection wire provides ground to the sensor antenna and loops with the third wire connection, creating a normally close loop circuitry. If and when the sensor detects the presence of a communication interfering object around the proximity of said antenna, the sensor circuitry opens the second and third connection loop, which causes the RF communication device to produce an alarm signal. If the antenna sensor connection wire is cut or disconnected, again the loop opens and the RF communication device produces a tamper alarm signal. Tamper detection antenna of the present invention additionally communicates with the wireless communication devise with an encryption coded data through the antenna hard wire connection, to secure the operation of tamper sensor antenna, thus avoiding intruders from tampering with the antenna.

DESCRIPTION OF THE DRAWINGS

These and other advantages of the present invention are best understood with reference to the drawings, in which;

FIG. 4. Is a drawing of Block Diagram.

DETAILED DESCRIPTION OF THE PREFERRED EMBODIMENT

Figures 1A, 1B, 2B:
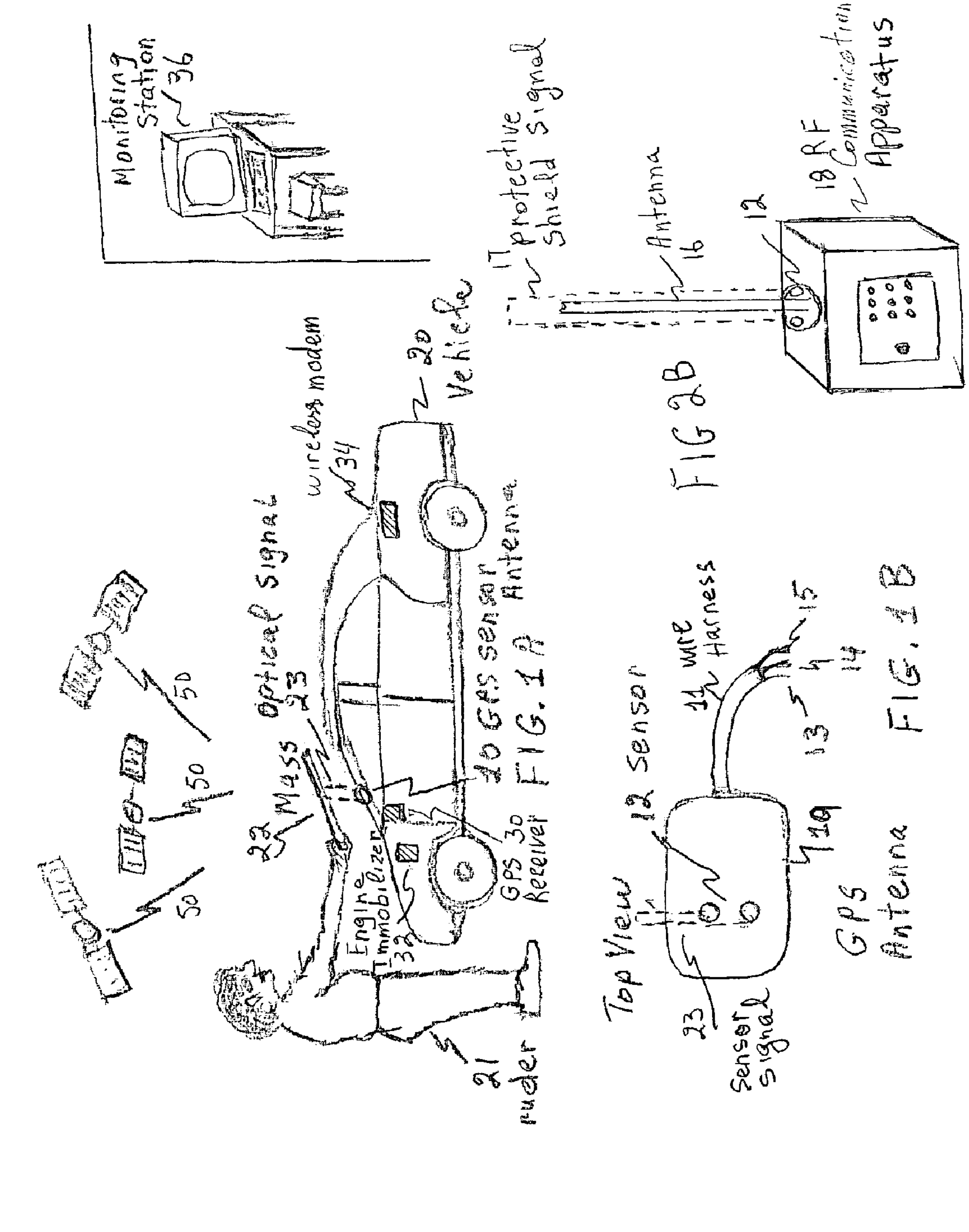
FIG. 1A. Is a drawing of a vehicle equipped with a tamper detection sensor antenna generating diffused reflection optical signal, In which illustrates the detection of presence of a mass. The mass blocking GPS satellite signal from reaching vehicle mount GPS antenna.
FIG. 1B. Is a drawing of a GPS antenna equipped with sensors, using tamper detection connection cable.
FIG. 2B. Is a drawing of an antenna equipped with sensors, and used with a wireless communication apparatus.

Tamper detection antenna system of the present invention as illustrated in FIG. 1A wherein a vehicle 20 is equipped with a GPS sensor antenna 10. The antenna comprises of, a GPS antenna FIG. 1B. 19 and a diffused reflection optical sensor 12, utilizing a wire harness 11. For receiving power and for data communication with GPS unit FIG. 1A 30 using harness terminal 13, and for receive ground signal using harness terminal 14, which is looped within the antenna sensor circuitry with harness terminal 15. Terminal 15 loop will open upon sensor 12 detection signal. The antenna sensor of present invention generates a diffused reflection optical signal FIG. 1 A. 23 towards a direction pattern set for a preset distance from said sensor antenna 10. When an intruder 21 with the intention to steel a vehicle, by blocking the vehicle GPS antenna 10 receiving signals from Global position satellites 50. When the intruder 21 puts an object (Mass) 22 within said sensor generated signal field proximity 23, said signal 23 becomes interrupted. The sensor antenna 10 upon detecting the presence of said signal 23 interruption for a predetermine time, sends a signal to said vehicle 20 GPS receiver CPU 30, which upon receipt of said signal will transmit a signal containing information both to said vehicle 20 location, and to said vehicle GPS "antenna tamper"10 condition, to a monitoring station 36 through said vehicle mount wireless modem 34, and additionally sends a signal to said vehicle engine immobilizer circuitry 32 to safely immobilize said vehicle engine. To ascertain monitoring station 36 vehicles 20 last known location.

In a preferred embodiment of the present invention said GPS sensor antenna 19 harness terminal 14 and 15, wherein said terminal 14 and 15 are loop together. When the Antenna sensor 12 detects the presence of an object for a predetermined time within a set proximity of said sensor signal 23, the sensor opens the normally close contact terminal 14 and 15, which will cause the vehicle GPS unit 30 to initiate an antenna tamper signal. Additionally if an attempt is made by an intruder to bypass the GPS sensor antenna, by cutting GPS antenna wire harness terminal 13,14, and 15, again an open loop, which causes vehicle GPS receiver unit to transmit an "Antenna tamper" signal.

Figure 2A:
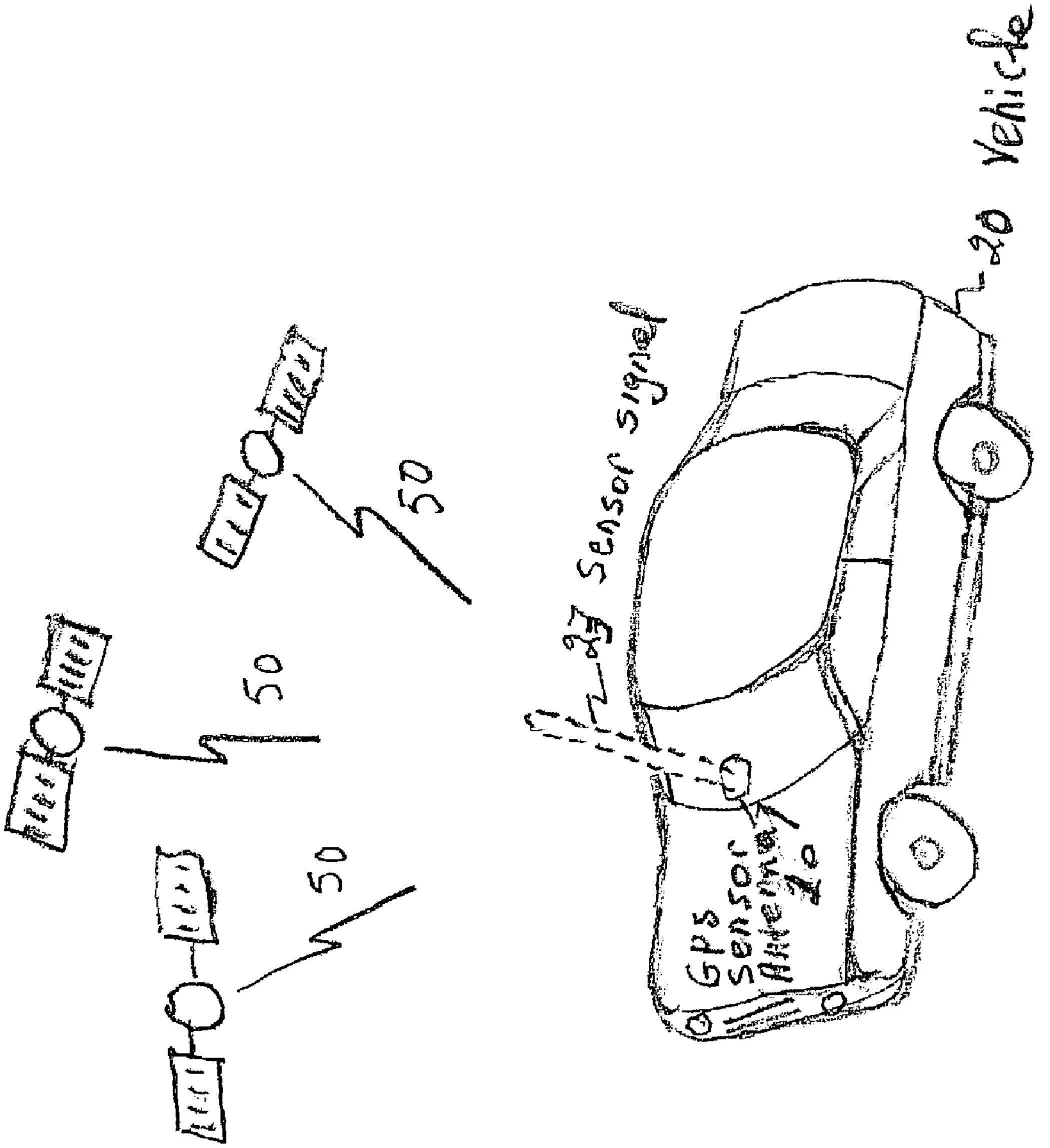
FIG. 2A. Is a drawing of a vehicle equipped with a tamper detection sensor antenna, wherein the sensor generated signal is not interrupted by the presence of an object, and the GPS antenna successfully receiving signal from the satellites above.

The present invention tamper detection sensor antenna as illustrated in FIG. 2A. wherein the Vehicle 20 is equipped with GPS sensor antenna 10, which is generating optical sensor signals 23, and as shown in the drawing there is no presence of an object within proximity of said sensor generated signal 23, to be detected by the sensor antenna 10, and the GPS satellite 50 signals is being received by the vehicle 20 mount GPS antenna 10 without any interference.

The present art tamper detection sensor antenna is useful in plurality of RF communication application, one such system shown in FIG. 2B. wherein a wireless communication apparatus 18 such as a commercial or residential alarm installed in a location, used for reporting security violations wirelessly to a monitoring station. the apparatus is equipped with an RF communication antenna 16 and optical sensor 12 generating diffused reflection protective shield signal 17 around the RF antenna 16. As shown in FIG. 2B the apparatus antenna 16 is not covered by an object, such as an aluminum foil, which blocks the apparatus 18 RF communications. As indicated in FIG. 2B. The apparatus 18, successfully transmitting and receiving wireless communications through the antenna 16.

Figure 3:
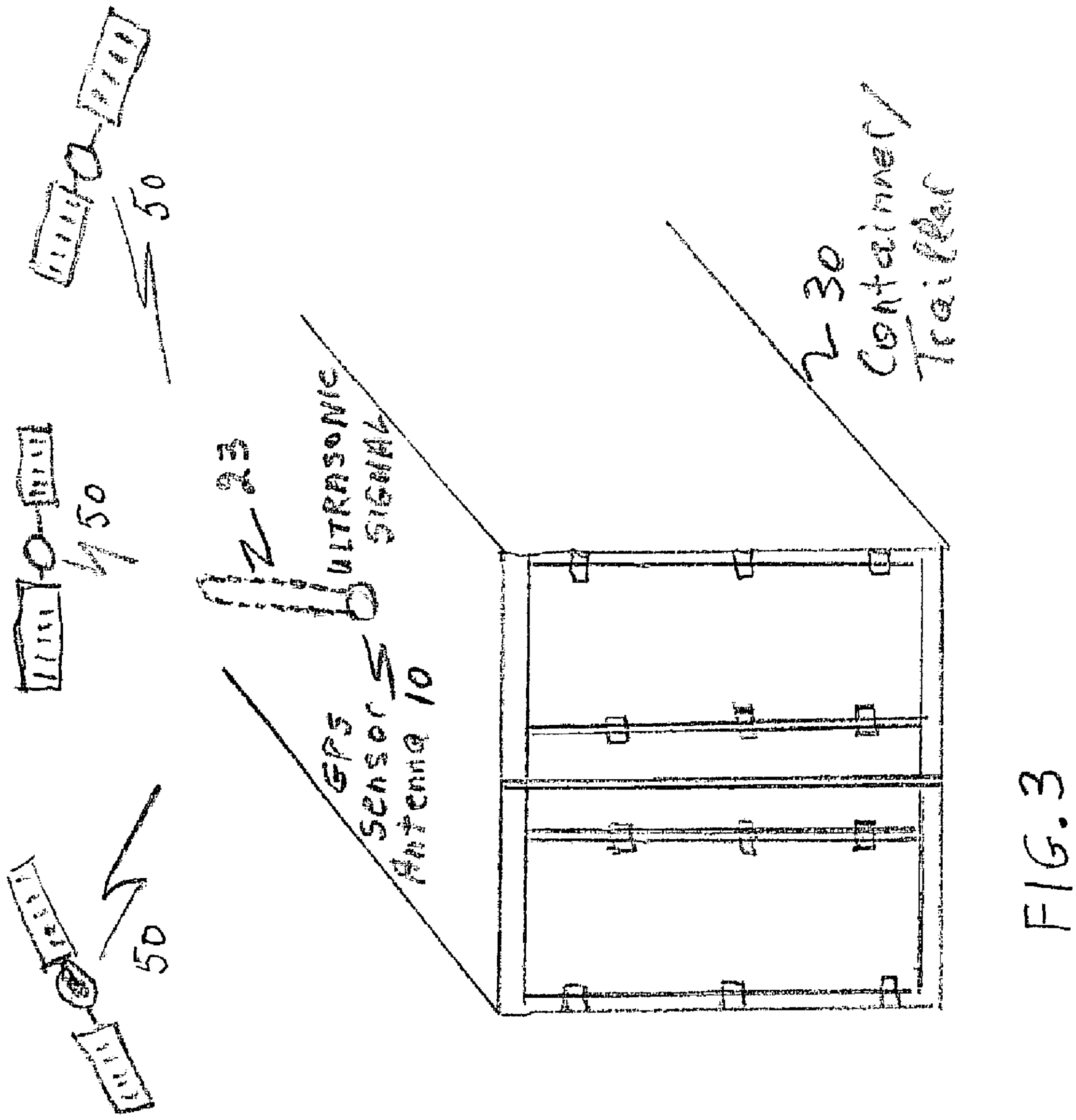
FIG. 3. Is a drawing of a container or a trailer equipped with a GPS sensor antenna using optical or ultrasonic sensors.

The present invention of tamper detection sensor antenna sensor generated optical signal for the detection to the presence of a communication interfering object within proximity of a communication antenna, additionally could utilize an ultrasonic, microwave, or electromagnetic field signal generating sensors. One such example shown in FIG. 3. wherein a container/Trailer 30 mount GPS sensor antenna 10 is generating an ultrasonic signals 23 for the detection of a mass within the proximity of said ultrasonic generated signal 23.

Tamper detection sensor antenna used for generating Optical signal for detection to the presence of a communication interfering object within proximity of an antenna, is primarily usefully when a sensor antenna is installed behind a see through object, such as inside of a vehicle on the dash or rear view mirror facing the vehicle windshield, for GPS and other RF vehicle communication means. Or installed on, or used with an RF communication apparatus, such as a security Alarm panel etc.

The Ultrasonic sensor is useful, when sensor antenna is installed outside of a vehicle, trailer for GPS and other communication means, or installed on or used with an RF communication apparatus.

The microwave and Electromagnetic sensor antenna is useful when the sensor antenna it's mounted under vehicle dashboard, on a vehicle, or container/trailer for GPS and other vehicle RF communication means, or could be utilized in a location with an RF communication apparatus.

Tamper detection sensor antenna of the present invention is of construction which is both durable and long lasting, and which requires little or no maintenance to be provided by the user through its operation lifetime. The tamper detection sensor antenna of the present invention is also of inexpensive construction to enhance its market appeal and thereby afford it the broadest possible market. Finally all of the aforesaid advantages and objectives of the tamper detection antenna system of the present invention are achieved without incurring any substantial relative disadvantage.

What is claimed is:

1. A tamper detection sensing antenna comprising:

an antenna and proximity sensor, wherein said antenna is used for RF communication, and said sensor is used for generating signals in the proximity of said antenna so as to detect the presence of antenna communication interfering objects within the proximity of said sensing antenna;

wherein when said sensing antenna defects the presence of communication interfering objects within the proximity of the antenna for a predetermined time, said sensor transmits a communication interference detection alarm signal.

2. A tamper detection sensing antenna of claim 1, wherein said sensor is connected to an apparatus, wherein said apparatus receives said communication interference detection alarm signal for a predetermined time, said apparatus generates audio and/or visual alarm signals to warn about the presence of said communication interfering object in proximity of said antenna.

3. The tamper detection sensing antenna of claim 1, wherein said antenna is connected to a communication apparatus, said communication apparatus transmitting said communication interfering detection alarm signal to a monitoring station, wherein said alarm signal to a monitoring station, wherein said alarm signal includes information pertaining to both a tamper alarm condition, and information pertaining to a condition and/or location of the communication apparatus.

4. The tamper detection sensing antenna of claim 3, wherein said communication apparatus further includes a secondary antenna, and wherein said tamper alarm signal is transmitted via a hardwired connection or wirelessly via said secondary antenna by said apparatus to the monitoring station.

5. The tamper detection sensor antenna as claimed in claim 3, wherein said sensor antenna is a GPS antenna which is connected to a GPS receiver unit containing a wireless communication apparatus and a wireless communication apparatus antenna, said GPS antenna and GPS receiver unit being installed on at least one mobile asset used for tracking a location of said at least one asset.

6. The tamper detection sensing antenna as claimed in claim 5, wherein said wireless communication apparatus of the GPS receiver unit is a wireless communication device, said device transmitting said communication interfering tamper alarm signal via said wireless communication apparatus antenna.

7. The tamper detection sensing antenna of claim 1, further including a secondary antenna, wherein said antenna of the tamper detection sensing antenna is connected to a communication apparatus through a hard wire connection means, said connection means being tamper proof such that if said connection means is tampered with, said apparats transmits a tamper alarm signal to a monitoring station via said hard wire connection means, or wirelessly through said antenna of the tamper detection sensing antenna, and/or said secondary antenna.

8. The tamper detection sensing antenna as claimed in claim 1, wherein said sensing antenna is connected to a communication apparatus with a normally closed loop connection via a wire harness, such that when said harness is tampered with or disconnected, said normally closed loop connection becomes open, and the communication apparatus generates and/or transmits a tamper alarm signal to a monitoring station.

9. The tamper detection sensing antenna as claimed in claim 5, wherein said GPS antenna is installed on a vehicle that includes vehicle immobilizer circuitry, and said sensing antenna is connected to a vehicle GPS tracking apparatus, wherein hen said apparatus receives a communication interfering tamper alarm signal from said GPS tamper detection antenna for a predetermined time, said apparatus activating said vehicle immobilizer circuitry to immobilize said vehicle.

10. The tamper detection sensing antenna as claimed in claim 1, wherein said tamper detection sensing antenna is additionally equipped with a built-in RF transceiver which is used for establishing a wireless communication link between said tamper detection sensing antenna and a communication apparatus, said transceiver or communication apparatus randomly generating a unique coded signal so as to supervise operation of the antenna, wherein if a supervisory random communication signal is interrupted, said communication apparatus and/or said sensing antenna transmits and/or generates a tamper alarm signal.

11. The tamper detection sensing antenna as claimed in claim 9, wherein a vehicle communication apparatus transmits an antenna tamper detection signal to said monitoring station, and said monitoring station upon receipt of said signal, transmits a signal to said vehicle communication apparatus to cause immobilization of the vehicle.

12. The tamper detections of claim 1, wherein said signal is one of optical, RF Microwave, Electromagnetic, and ultrasonic signals.

* * * * *